Stevens & Patchen.
Hay Fork.
No. 79,406.   Patented June 30. 1868.
W. W. Stevens
John Patchen
Inventors
by
D. C. Holloway & Co
his attys
Witnesses:
Chas. F. Clausen
T. Neagle
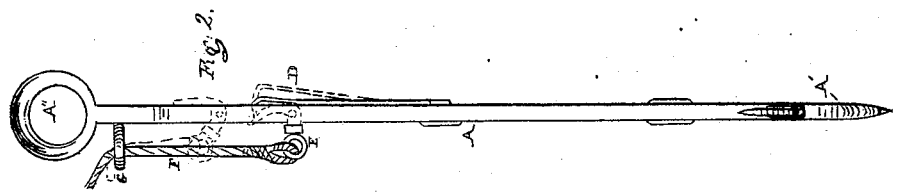
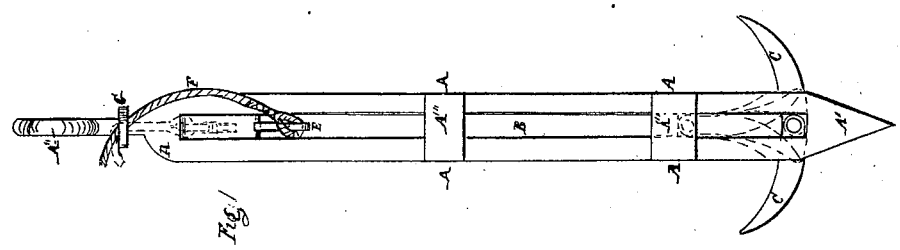

United States Patent Office.

W. W. STEVENS AND JOHN PATCHEN, JR., OF FONTOGANY, OHIO.

Letters Patent No. 79,406, dated June 30, 1868.

IMPROVEMENT IN HORSE HAY-FORKS.

*The Schedule referred to in these Letters Patent and making part of the same.*

TO ALL WHOM IT MAY CONCERN:

Be it known that we, W. W. STEVENS and JOHN PATCHEN, Jr., of Fontogany, in the county of Wood, and State of Ohio, have invented a new and useful Improvement in Hay-Forks; and we do hereby declare that the following is a full, clear, and exact description of the same, reference being had to the annexed drawings, in which—

Figure 1 is a front elevation, and
Figure 2 is a side elevation.

The same letters are used in both figures for the designation of parts which are identical.

Our improvements relate to that class of forks intended for use in stacking hay, in which a large quantity is raised at one operation by the aid of a horse, and consists in an improved device for detaching the hay from the tines of the fork when it has been raised over the place where it is desired to deposit it.

A is a four-sided bar of iron, terminating below in a point at A', and above in an eye, A'', by which the fork may be raised, a rope fastened in the eye being carried over pulleys to the point where the horse or other power is attached. This bar has a rectangular slot running its entire length, except that metal enough is left at the two ends to afford the required strength. A square rod of iron, B, is fitted into this slot, short enough to afford the requisite vertical play to operate the tines C, which are curved metallic pieces, sharp on the points, and pivoted to the lower end of the rod. The tines C project laterally through slots in the sides of the bar A, which slots are a little longer than the width of the tines, and bevelled from the outside towards the rod, as shown by dotted lines in fig. 1. Cross-pieces, A''', are placed over the slot, to keep the rod B in place.

D is a spring, attached to one of these cross-pieces, and extending upwards along the rod B. It is bent at right angles at the upper end, the bent end, F, resting above the end of the rod B when it is depressed to throw out the tines, and sustaining the weight of the hay caught by the tines. In the upper end of the rod B is a slot in which is placed a bell-crank lever E, to an eye on the end of which is attached a cord, F. The bell-crank is pivoted at the angle by a pin passing through it and the rod.

The cord is carried through an eye, G, for the purpose of giving a vertical strain upon the bell-crank. The other end of the bell-crank lever rests against the bent end of the spring D, and serves to press back the spring, and release the end of the rod B. When this is done, the weight of the hay, acting on the projecting ends of the tines, causes them to act as a lever of the first order, of which the bottom of the slots, through which they are projected, is the fulcrum, thereby forcing upwards the rod B, and causing the tines to be retracted through the slots, so that the hay may slip off from the fork. This operation is assisted by the strain upon the cord.

In operating with this fork, the rod B being drawn up, the point A' is forced into the loose hay to be raised, when the rod is forced down, thereby extending the tines to a position at right angles to the stem of the fork, when the bent end of the spring D catches the top of the rod B, and holds the tines extended, sustaining the hay until it has been raised to a point where it is to be discharged, when, by drawing on the cord F, the spring is pressed back by the bell-crank E, and the load discharged.

What we claim as our invention, and desire to secure by Letters Patent, is—

The combination and arrangement of the stem A, rod B, tines C, spring D, bell-crank E, and cord F, substantially as and for the purpose set forth.

In testimony whereof, we have signed our names to this specification in the presence of two subscribing witnesses.

W. W. STEVENS,
JOHN PATCHEN, Jr.

Witnesses:
H. RUDD,
C. H. THORNDIKE.